United States Patent
Dinsdale et al.

(10) Patent No.: US 6,726,243 B2
(45) Date of Patent: Apr. 27, 2004

(54) TUNING THE PERFORMANCE OF COMPRESSED GAS-CONTAINING INFLATORS

(75) Inventors: Charles Paul Dinsdale, Farr West, ID (US); Matthew Scott Johnson, Salt Lake City, UT (US); Linda M. Rink, Princeton, ID (US); Karl K. Rink, Princeton, ID (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/159,992

(22) Filed: May 31, 2002

(65) Prior Publication Data

US 2003/0222444 A1 Dec. 4, 2003

(51) Int. Cl.⁷ .............................................. B60R 21/26
(52) U.S. Cl. ...................................... 280/741; 280/736
(58) Field of Search ............................... 280/741, 736, 280/742

(56) References Cited

U.S. PATENT DOCUMENTS

| | | | | |
|---|---|---|---|---|
| 3,773,353 A | | 11/1973 | Trowbridge et al. ........ 280/737 |
| 5,348,344 A | * | 9/1994 | Blumenthal et al. ........ 280/741 |
| 5,350,192 A | | 9/1994 | Blumenthal ................. 280/741 |
| 5,356,176 A | * | 10/1994 | Wells ........................ 280/741 |
| 5,433,476 A | | 7/1995 | Materna et al. ............. 280/736 |
| 5,551,723 A | | 9/1996 | Mahon et al. .............. 280/742 |
| 5,713,597 A | * | 2/1998 | Bailey ........................ 280/741 |
| 5,786,543 A | | 7/1998 | Staudhammer et al. ..... 102/288 |
| 5,788,270 A | | 8/1998 | HÅland et al. ............. 280/729 |
| 5,820,161 A | * | 10/1998 | Svensson ................... 280/741 |
| 5,941,562 A | * | 8/1999 | Rink et al. ................. 280/741 |
| 6,129,380 A | * | 10/2000 | Rink et al. ................. 280/741 |
| 6,155,600 A | | 12/2000 | Reynolds et al. ........... 280/741 |
| 6,170,867 B1 | * | 1/2001 | Rink et al. ................. 280/741 |
| 6,170,868 B1 | * | 1/2001 | Butt et al. .................. 280/741 |
| 6,186,540 B1 | | 2/2001 | Edgren ...................... 280/735 |
| 6,221,186 B1 | * | 4/2001 | Rink et al. ................. 280/741 |
| 6,233,908 B1 | * | 5/2001 | Rink et al. ................. 280/741 |
| 6,238,500 B1 | * | 5/2001 | Blomquist .................. 280/741 |
| 6,244,623 B1 | | 6/2001 | Moore et al. ............... 280/737 |
| 6,254,129 B1 | * | 7/2001 | Rink et al. ................. 280/736 |
| 6,286,864 B1 | | 9/2001 | Green et al. ................ 280/741 |
| 6,289,814 B1 | | 9/2001 | Rink et al. ................. 102/288 |
| 6,332,404 B1 | | 12/2001 | Rink et al. ................. 102/530 |
| 6,431,595 B1 | * | 8/2002 | Swann et al. ............... 280/741 |
| RE37,843 E | * | 9/2002 | Blumenthal et al. ........ 280/741 |
| 6,554,315 B2 | * | 4/2003 | Freesmeier ................. 280/741 |
| 2001/0054461 A1 | | 12/2001 | Rink et al. ..................... 149/1 |
| 2003/0057684 A1 | * | 3/2003 | Freesmeier ................. 280/741 |
| 2003/0098572 A1 | * | 5/2003 | Katsuda et al. ............. 280/741 |

FOREIGN PATENT DOCUMENTS

| | | |
|---|---|---|
| DE | 2 344 518 | 3/1974 |
| DE | 197 01 663 | 7/1998 |
| DE | 100 64 191 A 1 | 8/2001 |
| EP | 1075988 A2 * | 2/2001 |
| EP | 1 300 301 A2 | 4/2003 |
| EP | 1300301 A2 * | 4/2003 |
| GB | 1 386 422 | 11/1972 |
| JP | 2002-29358 B1 * | 1/2002 |
| WO | 93/11971 | 6/1993 |
| WO | 94/26562 | 11/1994 |
| WO | WO 99/12775 | 3/1999 |

\* cited by examiner

*Primary Examiner*—Darren W. Ark
(74) *Attorney, Agent, or Firm*—James D. Erickson; Sally J. Brown

(57) ABSTRACT

An inflator apparatus wherein the molecular weight of the gas mixture therein contained is manipulated by varying the relative amounts of the various constituents thereof. Through such manipulation and tight control of gas mixture molecular weight, the performance of the inflator can be properly tuned such as to desirably control or influence the speed of deployment of an associated airbag cushion and minimize or reduce damage to an associated airbag cushion caused by excessive deployment speeds, as well as satisfy the relatively onerous inflation demands required for proper or desired operation of various close proximity airbag cushions or inflatable restraint devices.

39 Claims, 6 Drawing Sheets

TUNING THE PERFORMANCE OF COMPRESSED GAS-CONTAINING INFLATORS

BACKGROUND OF THE INVENTION

This invention relates generally to the inflation of inflatable vehicle occupant restraint airbag cushions used in inflatable restraint systems. More specifically, the invention relates to devices, systems and methods used in the inflation of inflatable vehicle occupant restraint airbag cushions, particularly close proximity inflatable airbag cushions.

It is well known to protect a vehicle occupant by means of safety restraint systems which self-actuate from an undeployed to a deployed state without the need for intervention by the operator, i.e., "passive restraint systems." Such systems commonly contain or include an inflatable vehicle occupant restraint or element, such as in the form of a cushion or bag, commonly referred to as an "airbag cushion." In such systems, the airbag cushion is normally housed in an uninflated and folded condition to minimize space requirements. Upon actuation of the system, such airbag cushions begin to be inflated, in a matter of no more than a few milliseconds, with gas supplied or produced by a device commonly referred to as an "inflator."

In practice, such airbag cushions may desirably deploy into one or more locations within the vehicle between the occupant and certain parts of the vehicle interior, such as the doors, steering wheel, instrument panel or the like, to prevent or avoid the occupant from forcibly striking such parts of the vehicle interior. Various types or forms of such passive restraint assemblies have been developed or tailored to provide desired vehicle occupant protection based on either or both the position or placement of the occupant within the vehicle and the direction or nature of the vehicle collision. For example, driver and passenger inflatable restraint installations have found wide usage for providing protection to drivers and front seat passengers, respectively, in the event of head-on type of collision.

While customary or common forms or types of driver and passenger inflatable restraint installations are helpful and generally effective in providing protection to drivers and front seat passengers, respectively, in the event of head-on types of collisions, further inflatable restraint developments have been sought to provide improved or increased vehicle occupant protection. For example, various forms or types of inflatable airbag cushions have been designed or proposed for placement and inflation in close proximity to the vehicle occupant such as to provide increased vehicle occupant protection in the event of a vehicle collision or impact inflicted or imposed from a direction other than head-on, i.e., "side impact." In addition, particular forms or types of close proximity airbag cushions have been developed or proposed for increased or improved protection of particular regions or areas of an occupant. For example, thorax side impact airbag cushions or combined head and thorax side impact airbag cushions can be provided or included to provide increased or improved protection to either or both the head or thorax of a vehicle occupant.

One particularly effective form of side impact inflatable restraint is the subject of HÅland et al., U.S. Pat. No. 5,788,270, issued Aug. 04, 1998, the disclosure of which patent is hereby incorporated by reference herein in its entirety and made a part hereof. Inflatable elements, such as disclosed in HÅland et al., U.S. Pat. No. 5,788,270, may desirably include an inflatable portion formed from two layers of fabric with the front layer and the back layer of the fabric woven together at selected points. In particular embodiments, such selected points are arranged in vertically extending columns and serve to divide the inflatable part into a plurality of vertical parallel chambers. The spaces between the selected points permit internal venting between adjacent chambers of the inflatable element. Particular such inflatable devices/elements, such as utilized in applications to provide protection over an extended area and having a generally planar form, are frequently referred to as "inflatable curtains."

A one piece woven construction has been found to be a particularly effective method of forming such inflatable element airbag cushions. In particular, one piece woven constructions have been found to provide a relatively low cost method of constructing suitable such airbag cushions which provide desired stand-up times. While inflatable element airbag cushions can, as is known in the art, be fabricated of various materials, nylon 6,6 has been found to be a particularly effective and useful material for use in the making or manufacture of inflatable curtain elements such as described above and having a one piece woven design.

Particular forms of close proximity inflatable airbag cushions for use in vehicular inflatable restraint systems include curtain and/or other side impact (head, thorax, combined, etc.) airbag cushions, knee airbag cushions bags as well as other relatively thin airbag cushions such as for near deployment to a vehicle occupant.

Upon deployment, the period of time during which an airbag cushion remains pressurized is commonly referred to as "stand-up time." In practice, driver side and passenger side airbag cushions are typically desirably designed to begin deflating almost instantaneously upon deployment such as to avoid presenting an undesirably hard or ungiving surface to an oppositely seated vehicle occupant. However, in the event of certain accidents or collisions, airbag cushions which provide substantially longer stand-up times may be required or desired in order to provide a suitable desired level of occupant protection.

For example, one particularly troublesome form of side impact is commonly referred to as a "roll-over." In a roll-over incident, a vehicle may undergo a partial, complete or multiple roll-over. As will be appreciated by those skilled in the art, roll-over accidents can be particularly demanding on inflatable restraint systems. In particular, an airbag cushion designed to provide occupant protection in the event of a vehicle roll-over may be required or desired to remain pressurized for an extended or prolonged period of time, as compared to usual or typical driver side and passenger side airbag installations. For example, a roll-over protection side impact airbag cushion desirably remains pressurized or provides a stand-up time as long as about 5 seconds or more, such as evaluated based on a cushion internal pressure of greater than 25 kPa.

Further, as close proximity airbag cushions are designed and/or situated for near deployment to a vehicle occupant, such airbag cushions are generally required to be deployed into proper position within the vehicle interior in a very rapid manner, e.g., in less than 20 milliseconds. Further, proper or desired airbag cushion inflation commonly requires cushion pressures in excess of about 80 kPa at a point in time of 30 milliseconds after deployment initiation.

Additional system performance criteria include cushion in-position and integrity requirements as well as the need and desire to reduce, minimize or avoid damage to the cushion such as by reducing the molar flow rate and temperature of the inflation medium flowing into the cushion.

Further, satisfaction of such performance criteria at a lower or reduced cost and in a manner in which the envelope and weight of the system is minimized are ongoing design and engineering objectives. As will be appreciated, significant contributors to the cost of such inflation systems typically include cushion coating, inflator size, pyrotechnic requirements and the need for gas guides or other added design features. For example, cushion coating may be required or desired in order to avoid or minimize cushion stress and damage associated with deployment and inflation. By reducing the size of the inflator, e.g., minimizing the amount of required metal, and the amount or requirement for inclusion of a pyrotechnic, system costs can be reduced.

In view of the above, there is a need and a demand for improved apparatus or device for inflating such airbag cushions as well as for an improved corresponding inflatable restraint system and method for inflating a close proximity inflatable airbag cushion.

SUMMARY OF THE INVENTION

A general object of the invention is to provide one or more of an improved apparatus or device for inflating an inflatable device, an improved inflatable restraint system and an improved method for inflating a close proximity inflatable airbag cushion.

A more specific objective of the invention is to overcome one or more of the problems described above.

The general object of the invention can be attained, at least in part, through an apparatus for inflating an inflatable device. In accordance with one preferred embodiment of the invention, such an apparatus includes a chamber containing a gas mixture under an elevated pressure and having an average molecular weight of at least 10 and no more than 15. The gas mixture is effective to provide a gaseous inflation medium to inflate the inflatable device. The apparatus also includes a chamber opener actuatable to open the chamber. The apparatus further includes a diffuser assembly including at least one exit port for directing gaseous inflation medium from the apparatus to the inflatable device.

The prior art generally fails to provide inflator devices, inflatable restraint systems and methods for inflating a close proximity inflatable airbag cushion which satisfy various performance criteria such as relating to initial cushion inflation and stand-up in a manner in which the envelope and weight of the system is minimized and in which the costs have been reduced or minimized to as great an extent as may generally be desired.

The invention further comprehends an inflatable restraint system which includes at least one close proximity inflatable restraint device and an inflator effective, upon actuation, to provide a gaseous inflation medium to at least one close proximity inflatable restraint device. The inflator contains a gas mixture under an elevated pressure and having an average molecular weight of at least 10 and no more than 15. In accordance with one preferred embodiment of the invention, the gas mixture consists essentially of at least two members of the group consisting of helium, argon, carbon dioxide, nitrous oxide, nitrogen and oxygen.

The invention still further comprehends a method for inflating a close proximity inflatable airbag cushion. In accordance with one preferred embodiment of the invention, such method involves actuating an inflator device having a chamber containing a gas mixture under an elevated pressure with the mixture having an average molecular weight of at least 10 and no more than 15 and consisting essentially of at least two members of the group consisting of helium, argon, carbon dioxide, nitrous oxide, nitrogen and oxygen, the gas mixture effective to provide a gaseous inflation medium to inflate the close proximity inflatable airbag cushion.

As used herein, references to "close proximity airbag cushion" are to be understood to refer to those airbag cushions such as curtain and/or other side impact (head, thorax, combined, etc.) airbag cushions, knee airbag cushions as well as other relatively thin airbag cushions which are designed and/or situated for near deployment to a vehicle occupant.

Further, references to "side impact" inflatable restraint systems, assemblies and the like are to be understood to generally encompass such systems, assemblies and such as adapted to provide vehicle occupant protection in the event of a side impact such as by providing one or more of roll-over protection (such as via an inflatable curtain inflation device), head/thorax protection (such as via a head/thorax side impact inflation device) and thorax protection (such as via a thorax side impact inflation device).

As used herein, references to "dissociation," "dissociation reactions" and the like are to be understood to refer to the dissociation, splitting, decomposition or fragmentation of a single molecular species into two or more entities.

"Thermal dissociation" is a dissociation controlled primarily by temperature. It will be appreciated that while pressure may, in a complex manner, also influence a thermal dissociation such as perhaps by changing the threshold temperature required for the dissociation reaction to initiate or, for example, at a higher operating pressure change the energy which may be required for the dissociation reaction to be completed, such dissociation reactions remain primarily temperature controlled.

An "exothermic thermal dissociation" is a thermal dissociation which liberates heat.

Unless otherwise specifically identified, references herein to molecular weights are to be understood as being n reference to or in units of grams per mole.

Other objects and advantages will be apparent to those skilled in the art from the following detailed description taken in conjunction with the appended claims and drawings.

DETAILED DESCRIPTION OF THE INVENTION

The present invention generally provides an inflator apparatus or device wherein the molecular weight of the gas mixture therein contained is manipulated by varying the relative amounts of the various constituents thereof. As detailed below, through such manipulation and tight control of gas mixture molecular weight, the performance of the inflator can be properly tuned such as to desirably control or influence the speed of deployment of an associated airbag cushion and minimize or reduce damage to an associated airbag cushion caused by excessive deployment speeds, as well as satisfy the relatively onerous inflation demands required for proper or desired operation of various close proximity airbag cushions or inflatable restraint devices.

Figure 1:
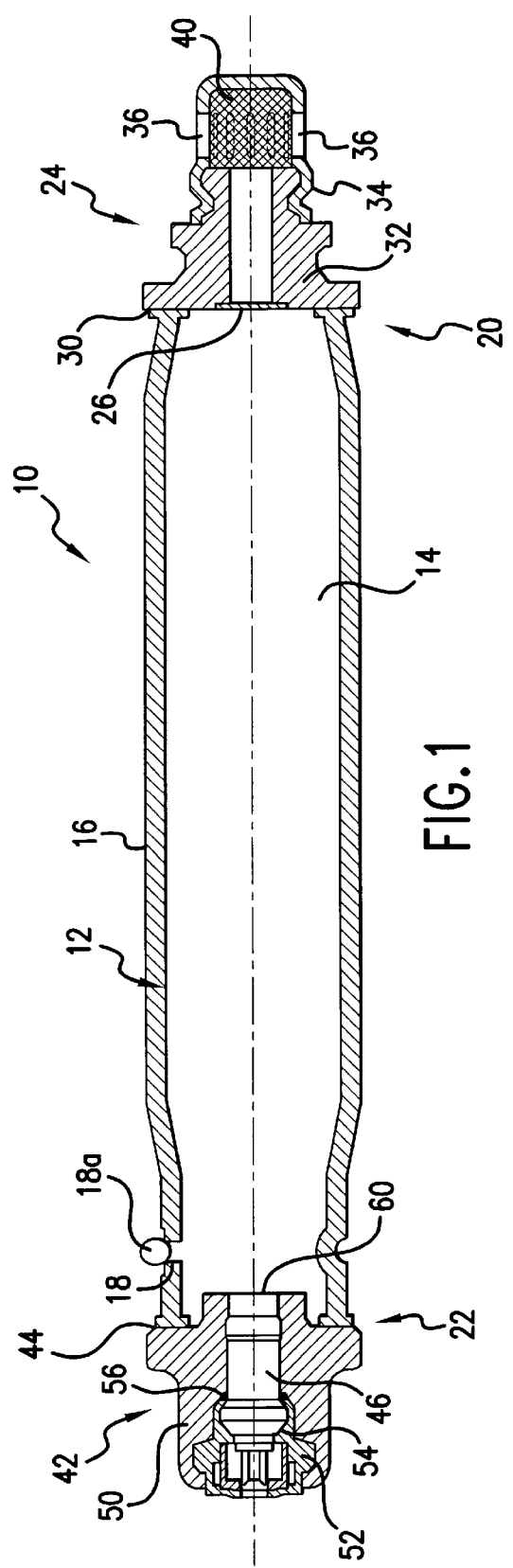
FIG. 1 is a partially in section, schematic drawing of an airbag inflator in accordance with one preferred embodiment of the invention.

The present invention may be embodied in a variety of structures. As representative, FIG. 1 illustrates the present invention as embodied in an apparatus, generally designated by the reference numeral 10, in accordance with one embodiment of the invention. Such a gas supplying or producing device can advantageously be used to effect the inflation of an inflatable device, particularly a close proximity form of inflatable airbag cushion such as a curtain and/or other side impact (head, thorax, combined, etc.) airbag cushion, knee airbag cushion or other relatively thin airbag cushion such as for near deployment to a vehicle occupant, for example.

While the invention is described below with particular reference to the inflation of inflatable devices such as in the form of a close proximity inflatable restraint device such as can be used in association with various automotive vehicles including vans, pick-up trucks, and particularly automobiles, it is to be understood that the invention also has applicability not only with other types or kinds of vehicles including, for example, airplanes, but also for the inflation of other types or forms of inflatable devices such as will be apparent to those skilled in the art and guided by the teachings herein provided.

Returning to FIG. 1, the inflation apparatus 10, sometimes referred to hereinafter as an "inflator", includes a first or storage chamber 12 filled and pressurized with an expandable fluid, designated by the reference numeral 14. As described in greater detail below, such an expandable fluid is generally effective to provide a gaseous inflation medium such as may be used in the inflation of an associated inflatable device. In particular, such an expandable fluid may typically be in the nature of one or more compressed gases. As will be appreciated, such a compressed gas can be stored in a gaseous, liquid or multi-phase form (i.e., partially gaseous and partially liquid mixture). In view thereof, the first chamber 12 is sometimes referred to herein as a gas/liquid storage chamber or as simply a storage chamber.

In accordance with a preferred embodiment of the invention, the expandable fluid 14 is a gas mixture having an average molecular weight of greater than 10 and less than 15. In accordance with one preferred embodiment, the gas mixture includes at least two members of the group consisting of helium, argon, carbon dioxide, nitrous oxide, nitrogen and oxygen. In general, helium is a particularly useful and preferred gas mixture component for use in the practice of the invention. For example, helium generally provides a relatively low mass flow such as may desirably reduce bag damage on deployment. Helium also generally provides a relatively high molar flow. Specific desirable gas mixtures for use in the practice of the invention include or contain at least about 70 molar percent helium and no more than about 85 molar percent helium, with particular preferred gas mixtures including or containing about 80 molar percent helium. Specific gas mixtures for use in the practice of the invention include gas mixtures of helium with either or both nitrous oxide and carbon dioxide. Particular examples of useful gas mixtures in accordance with the invention include gas mixtures which consist essentially of helium and at least one member selected from the group consisting of carbon dioxide and nitrous oxide.

The incorporation and use of nitrous oxide in the gas mixtures of the invention has been found to be particularly attractive. In particular, in accordance with the chemical reaction (1) identified below, nitrous oxide advantageously dissociates to form an increased molar content of gaseous products, with the dissociation products produced or formed upon the dissociation of nitrous oxide ideally being nitrogen and oxygen:

$$2N_2O = 2N_2 + O_2 \tag{1}$$

Thus, not only does such reaction form products which are generally non-toxic and non-corrosive but also results in the production or formation of molecular oxygen. As will be appreciated, such oxygen may then be available for subsequent reaction such as an oxidizer available for reaction with a fuel such as provided or made available by the initiating device and such as may result in further or enhanced inflation gas production or formation. Further, nitrous oxide, as compared to gases such as air, nitrogen and argon, liquefies relatively easily at ambient temperatures. Additionally, nitrous oxide is relatively inert up to temperatures of about 200° C. or more. As a result, nitrous oxide is desirably relatively safe to handle, thermally stable, facilitates storage, and alleviates manufacturing concerns.

In this regards it is noted that nitrous oxide, when in a mixture with helium rather than in a mixture of helium with another of the specified gases, e.g., argon, may result in a higher gas yield from dissociation. Without wishing to be bound by any theory of operation, it is theorized that the higher thermal conductivity of helium, as compared to other suitable gas mixture constituents, allows heat to be more efficiently transferred between nitrous oxide molecules and thus results in an increased or greater extent of dissociation.

The chamber 12 is defined by an elongated generally cylindrical sleeve 16, such as desirably in the form of an open ended seamless tube. The sleeve 16 includes a fill port 18, as is known in the art, wherethrough materials can be passed into the chamber 12. After the storage chamber 12 has been filled, the fill port 18 can be appropriately blocked or plugged, as is known, such as by a pin or ball 18a. As will be appreciated, such a fill port, if included in the inflator apparatus, can alternatively be placed or positioned, as may be desired and understood by those skilled in the art. Thus, the broader practice of the invention is not necessarily limited to the inclusion of a fill port or the position or placement thereof.

The sleeve 16 includes opposite first and second open ends, 20 and 22, respectively. An assembly, herein denominated a "diffuser assembly", generally designated by the reference numeral 24, is formed or appropriately joined or attached to the sleeve first end 20. Either as a part of the diffuser assembly 24 or as a separate element, the first chamber 12 is enclosed at the sleeve first end 20 by means of a burst disk 26. For example and as shown in FIG. 1, the first sleeve end 20 can be swagged and the diffuser assembly 24 joined thereto such as by means of an inertial weld 30.

The diffuser assembly 24 includes a boss 32 to which is joined or connected a diffuser element 34. The diffuser element 34 includes a plurality of exit ports 36, wherethrough the inflation gas from the inflator 10 and, particularly the diffuser assembly 24, is properly dispensed into an associated airbag cushion (not shown). Thus, the diffuser assembly 24 can serve to facilitate direction and ballistic control of the inflation fluid from the inflator 10 into the associated inflatable airbag cushion. As will be appreciated by those skilled in the art, the number and positioning of placement of the exit ports can be selected to provide particular inflation performance characteristics required or desired in or of a particular inflator installation.

Within the diffuser element 24 there is contained, if desired, an appropriate inflation medium treatment element 40 such as in the form of a filter such as composed of a metal mesh and such as may be desired to effect treatment of the inflation medium prior to passage into the associated airbag cushion.

An initiator assembly 42 is formed or appropriately joined or attached to the sleeve second end 22. For example and as shown, similar to the first sleeve end 20, the second sleeve end 22 can be swagged and the initiator assembly 42 joined thereto such as by means of an inertial weld 44. The initiator assembly 42 can desirably include an initiator 46, a base element 50 and an initiator adapter 52, with appropriate seal or attachment features including a seal washer 54, an O-ring 56, and a burst disk 60, for example.

In operation, such as upon the sensing of a collision, an electrical signal is sent to the initiator 46. The initiator 46 functions such as to initiate reaction of a squib-load of reactant such as to result in the rupture or otherwise opening of the burst disk 60 and the consequent rupture or otherwise opening of the burst disk 26. With the opening of the burst disk 26, some of the contents of the storage chamber 12 are released from containment therein. Such released material can then pass through the boss 30, through the treatment element 40 and out from the inflation apparatus 10 through the exit ports 36.

As will be appreciated, release of the expandable fluid 14, e.g., gas mixture, from confinement within the storage chamber 12 will result in the expansion thereof. Further, where such gas mixture includes nitrous oxide as a component, at least a portion of that nitrous oxide can, as identified above, advantageously undergo dissociation such as to produce or result in a further increased gaseous molar content, as may be desired in particular inflatable restraint applications.

Figure 2:
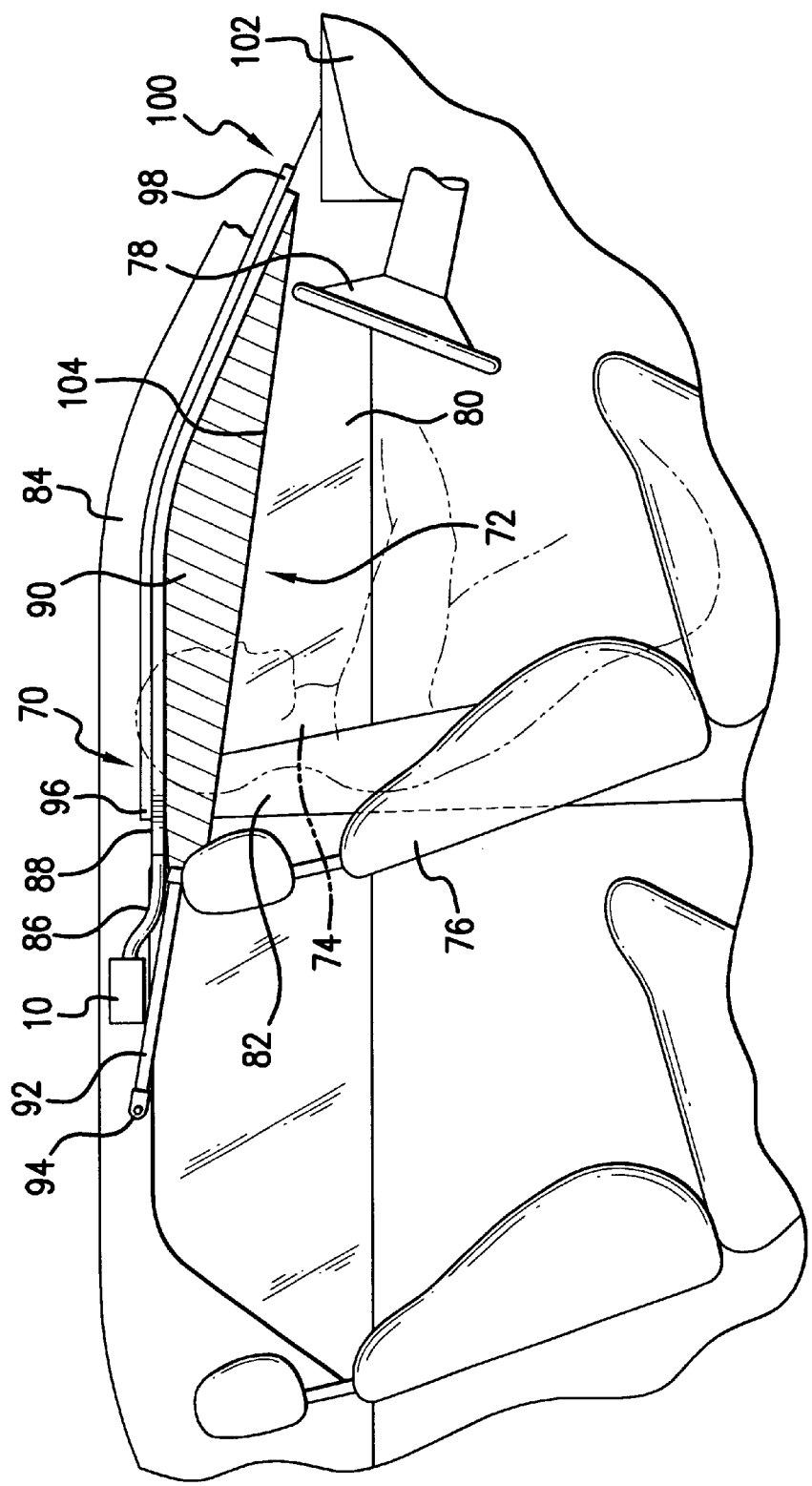
FIG. 2 is a side view of the interior of a motor vehicle illustrating an inflatable restraint system installation in accordance with one embodiment of the invention.

Turning to FIG. 2, there is illustrated an example of such an inflatable restraint system installation 70 within the interior of a motor vehicle. The restraint system 70 includes the inflation apparatus 10 and a close proximity inflatable restraint device 72 such as in the form of an inflatable curtain, such as of the type identified above and described in the above-referenced HÅland et al., U.S. Pat. No. 5,788,270.

The inflatable restraint system 70 and the safety device 72 thereof are intended to provide protection for a person 74 sitting in a seat 76 in the vehicle. In any accident in which the vehicle is decelerated, the person will tend to move forwardly towards the steering wheel 78, but will be restrained by a conventional seat belt or airbag. In the case of a side impact or roll-over, there is a risk that the head of the person 74 may strike either or both the window 80 in the door beside the person, or the vehicle B-pillar 82. There is also a risk that if, as frequently happens, the glass in the window 80 should break, the head of the person 74 may be thrown out of the window opening, especially in the case of a roll-over form of side impact.

The safety device 72, shown in the operative state in FIG. 2, is initially retained in a recess provided in the door frame 84 located above the door of the vehicle. The recess extends over more than simply a linear portion of the door frame so that the two ends of the recess are not in alignment with the main part of the recess.

The inflation apparatus 10 is, as described above, adapted to provide a gaseous inflation medium to the inflatable curtain safety device 72 to result in the desired inflation thereof.

The inflation apparatus 10 is associated with a sensor (not shown) which senses a side impact and/or a roll-over situation to activate the inflation apparatus 10 at an appropriate instant. The inflation apparatus 10 is connected by a hose 86 to a duct 88. The duct 88 forms part of the inflatable curtain safety device 72. The inflatable curtain safety device 72 incorporates a plurality of parallel substantially vertical, substantially cylindrical cells 90.

A webbing strap 92 extends from the end of the inflatable element 72 near the hose 86 to an anchoring point 94 on the door frame 84. The edge of the duct 88 is fixed securely to the door frame 84 between the point 96, adjacent the top of the B-pillar 82, and the point 98, at the lower part of the vehicle A-pillar 100, in the region of the dashboard 102.

When an accident such as in or of the form of a side impact occurs, the inflation apparatus 10 produces, forms or otherwise supplies a gaseous inflation medium which is passed through the hose 86 to the duct 88, and then inflates the cells 90. The inflatable curtain safety element 72 thus moves from its initial stored position within the recess in the door frame 84 to the operative position shown in FIG. 2. The inflatable element 72 thus extends downwardly from the top of the door frame 84 to form a generally flat structure located between the head of the person 74 and the adjacent window 80. As the cylindrical cells 90 inflate, the length of the lower edge 104 of the inflatable element 72 is reduced, and thus the lower edge, together with the webbing strap 92 extend substantially tightly between the point 94 and the point 98.

It is to be noted that part of the inflated element extends rearwardly beyond the point 96, and is thus located between the head of the person 74 and the top of the B-pillar 82. Thus, the risk of the head of the person impacting with the B-pillar is minimized. Since the upper edge of the inflatable element is secured to the upper part of the door frame along substantially the whole of its length, there is virtually no risk that the head of the occupant will pass between the upper edge of the inflatable element and the upper part of the door frame, with the head of the occupant of the vehicle thus inadvertently emerging from the body shell of the vehicle.

As will be appreciated, inflatable curtain inflatable elements such as described above can advantageously provide coverage over a large area or zone using an inflatable element of relatively small internal volume. Further, such inflatable curtain inflatable elements can advantageously provide or result in extended stand-up times such as maybe desired to provide more effective occupant protection in the event of a roll-over form of side impact.

While the invention has been described above making specific reference to an inflatable restraint system installation which includes or incorporates a close proximity inflatable restraint device in the form of an inflatable curtain, those skilled in the art and guided by the teaching herein provided will appreciate the applicability and practice of the invention in applications employing other forms or types of close proximity inflatable restraint devices including, other side impact (head, thorax, combined, etc.) airbag cushions, knee airbag cushions bags as well as other relatively thin airbag cushions such as for near deployment to a vehicle occupant.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

In the following examples, test inflators were compared relative to the following inflation performance criteria:

1. With regard to initial inflation:
    a. Cushion in-position in less than 20 mSec and
    b. Cushion pressure greater than 80 kPa at 30 mSec.
2. With regard to stand-up, cushion pressure greater than 25 kPa at 5 seconds

Examples 1–5

In each of these examples a test inflator similar in structure to the inflation apparatus 10 illustrated in FIG. 1 was employed. Each of these examples employed a gas mixture as shown in TABLE 1, below, and in each case the gas mixture load of 2.5 moles, at 21° C.

TABLE 1

| EXAMPLE | GAS MIXTURE | GAS MIXTURE MW |
|---|---|---|
| 1 | 30/70 He/Ar | 29.16 |
| 2 | 50/50 He/Ar | 21.98 |
| 3 | 60/40 He/Ar | 18.38 |
| 4 | 70/30 He/Ar | 14.79 |
| 5 | 80/20 He/Ar | 11.19 |

Figure 3:
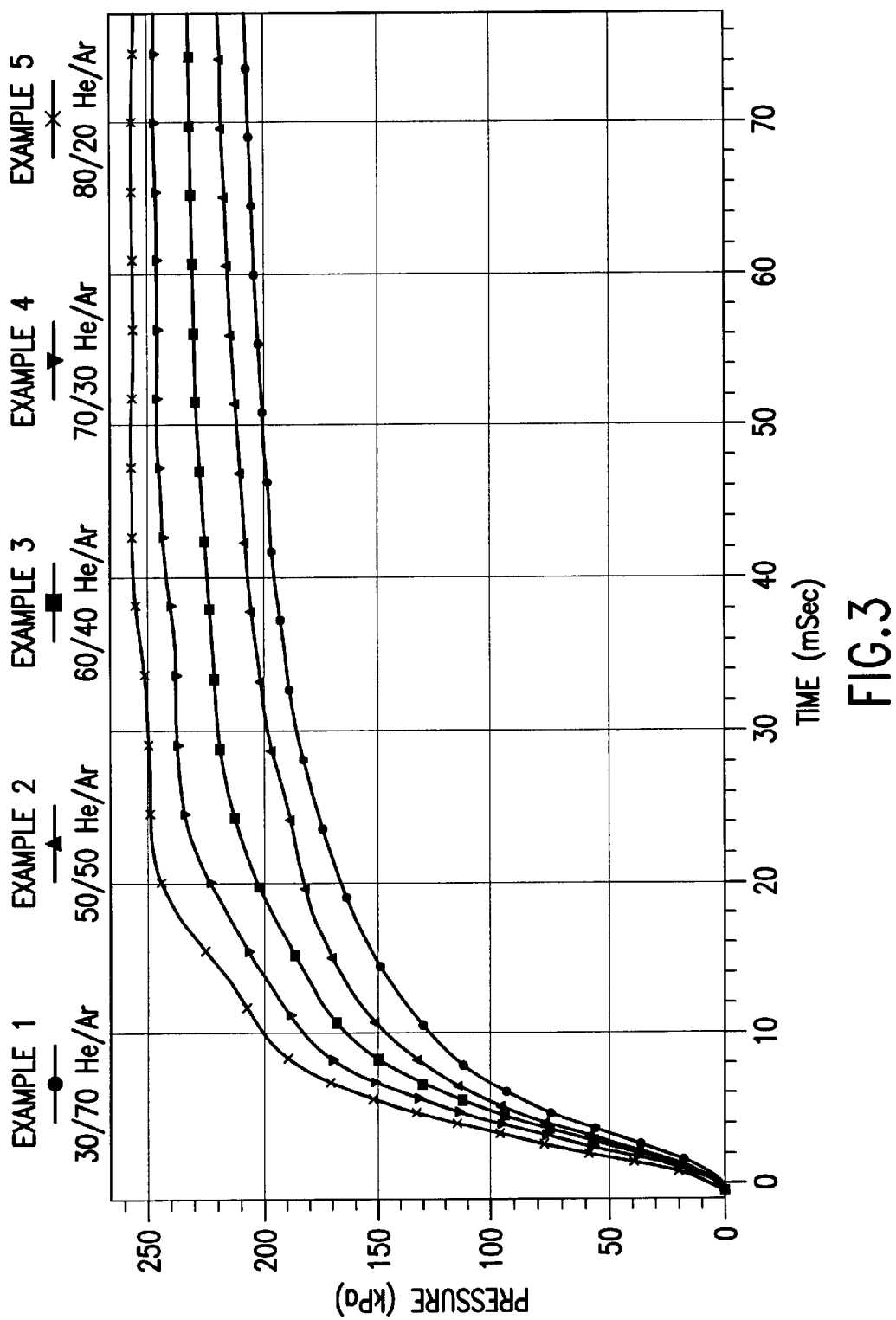
FIG. 3 is a graphical depiction of tank pressure as a function of time performance realized in Examples 1–5.

In each case, the test inflator employed a squib, without a booster, as the ignition device and each of the respective test inflators was fired into a one cubic foot test tank, with the pressure within the test tank measured as a function of time. FIG. 3 is a graphical depiction of tank pressure as a function of time for each of the test inflators of Examples 1–5.
Discussion of Results As shown in FIG. 3, increasing the molecular weight of the gas mixture lead to slower inflation performance. Where the gas mixture molecular weight was greater than about 15 g/mole, the inflator failed to meet cushion inflation requirements. Further, where the gas mixture molecular weight was less than about 10 g/mole, the inflator failed to satisfy stand-up requirements.

Examples 6–12

In each of these examples a test inflator similar in structure to the inflation apparatus 10 illustrated in FIG. 1 was employed. Each of these examples employed a gas load of 2.5 moles, at 21° C., and having the compositional breakdown shown in TABLE 2, below.

TABLE 2

| EXAMPLE | GAS | GAS MOLECULAR WEIGHT |
|---|---|---|
| 6 | 80/20 He/$N_2O$ | 12.00 |
| 7 | 80/20 He/$N_2O$ | 12.00 |
| 8 | 80/20 He/$N_2O$ | 12.00 |
| 9 | He | 4.00 |
| 10 | He | 4.00 |
| 11 | Ar | 39.95 |
| 12 | Ar | 39.95 |

Figure 4:
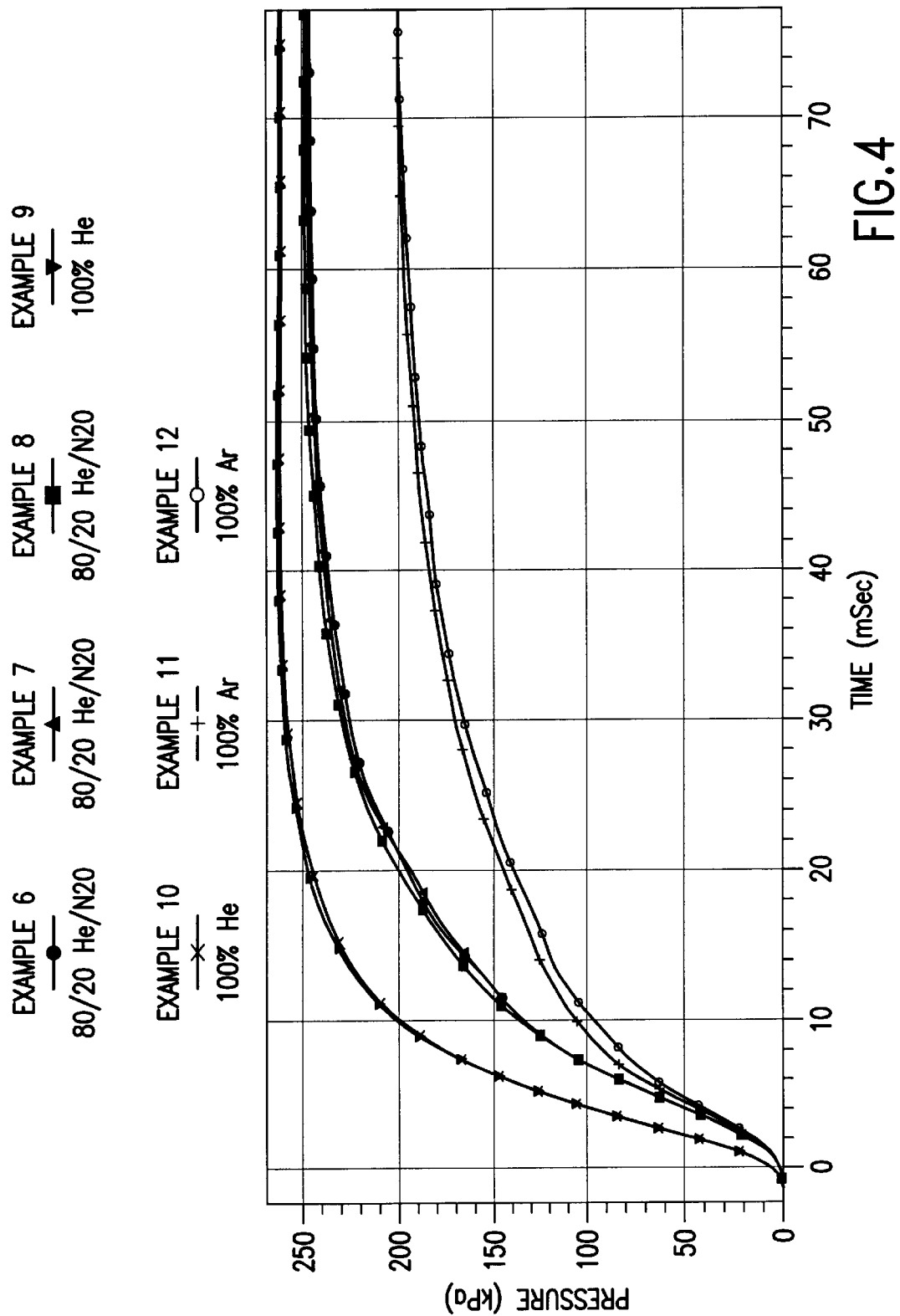
FIG. 4 is a graphical depiction of tank pressure as a function of time performance realized in Examples 6–12.

In each case, the test inflator employed a squib, without a booster, as the ignition device and each of the respective test inflators was fired into a one cubic foot test tank, with the pressure within the test tank measured as a function of time. FIG. 4 is a graphical depiction of tank pressure as a function of time for each of the test inflators of Examples 6–12.
Discussion of Results As shown in FIG. 4, the inflator devices which employed a gas mixture of 80/20 He/$N_2O$ exhibited a more gradual rise rate as evidenced by pressure versus time curves of reduced slope as compared to the respective curves for the inflator devices which employed a stored gas of only helium. As will be appreciated by those skilled in the art and guided by the teachings herein provided, the incorporation and use of inflator devices providing or resulting in such reduced rise rates desirably can reduce or minimize damage to the cushion upon inflation and produce or result in increased or improved cushion inflation stand-up times. Further, the inflator devices which employed a gas mixture of 80/20 He/$N_2O$ exhibited an increased rise rate, as compared to the inflator devices which employed a stored gas of only argon, with such gas mixture-containing inflator devices producing or resulting in satisfaction of cushion deployment in-position requirements. Thus, it will be appreciated that these examples illustrate the ability to tune inflator rise rate via the manipulation of the molecular weight of the stored gas.

Examples 13–15

In each of these examples a test inflator similar in structure to the inflation apparatus 10 illustrated in FIG. 1 was employed. Each of these examples employed a gas load of 2.5 moles, at 21° C., and having the compositional breakdown shown in TABLE 3, below.

TABLE 3

| EXAMPLE | GAS MIXTURE | GAS MIXTURE MOLECULAR WEIGHT |
|---|---|---|
| 13 | 80/20 He/$N_2O$ | 12.00 |
| 14 | 80/20 He/$CO_2$ | 12.00 |
| 15 | 80/20 He/Ar | 11.19 |

Figure 5:
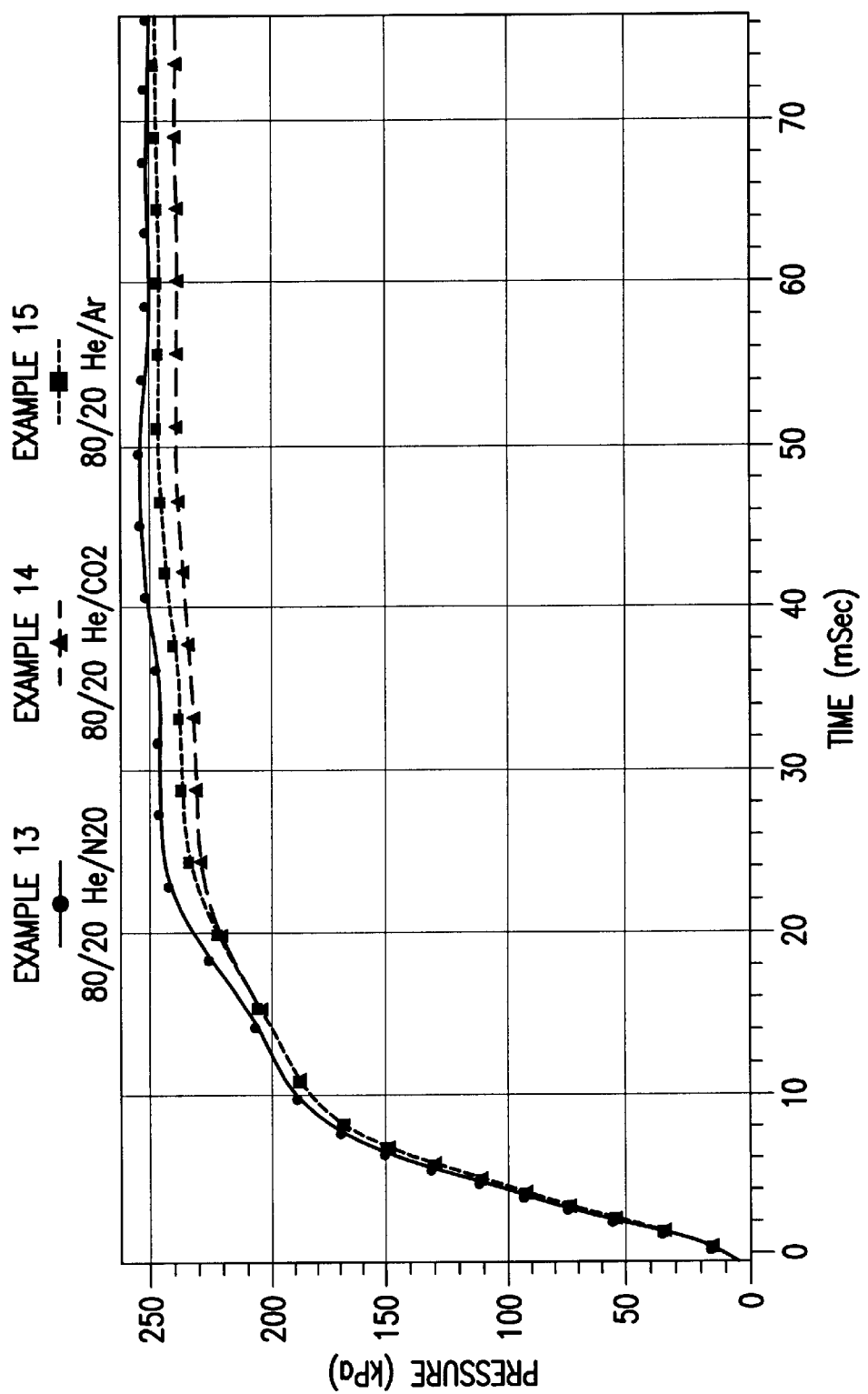
FIG. 5 is a graphical depiction of tank pressure as a function of time performance realized in Examples 13–15.

In each case, the test inflator employed a squib, without a booster, as the ignition device and each of the respective test inflators was fired into a one cubic foot test tank, with the pressure within the test tank measured as a function of time. FIG. 5 is a graphical depiction of tank pressure as a function of time for each of the test inflators of Examples 13–15.
Discussion of Results As shown in FIG. 5, the inflator device of Example 13 produced or resulted in a higher tank performance, as compared to the inflator devices of Examples 14 and 15, and satisfied cushion performance requirements.

Examples 16–21

In each of these examples a test inflator similar in structure to the inflation apparatus 10 illustrated in FIG. 1 was employed. Examples 16–18 employed a 2.25 mole gas mixture of 70/20/10 Ar/$N_2O$/He gas mixture and a 1.5 gram booster of igniter material in association with a squib initiator conditioned and fired at temperatures of 80° C., 21° C., and –40° C., respectively. Examples 19–21 employed a 2.5 mole gas mixture of 80/20 He/$N_2O$ conditioned and fired at temperatures of 90° C., 21° C., and –40° C., respectively. In Examples 19–21, the test inflator employed a squib, without a booster, as the ignition device.

Figure 6:
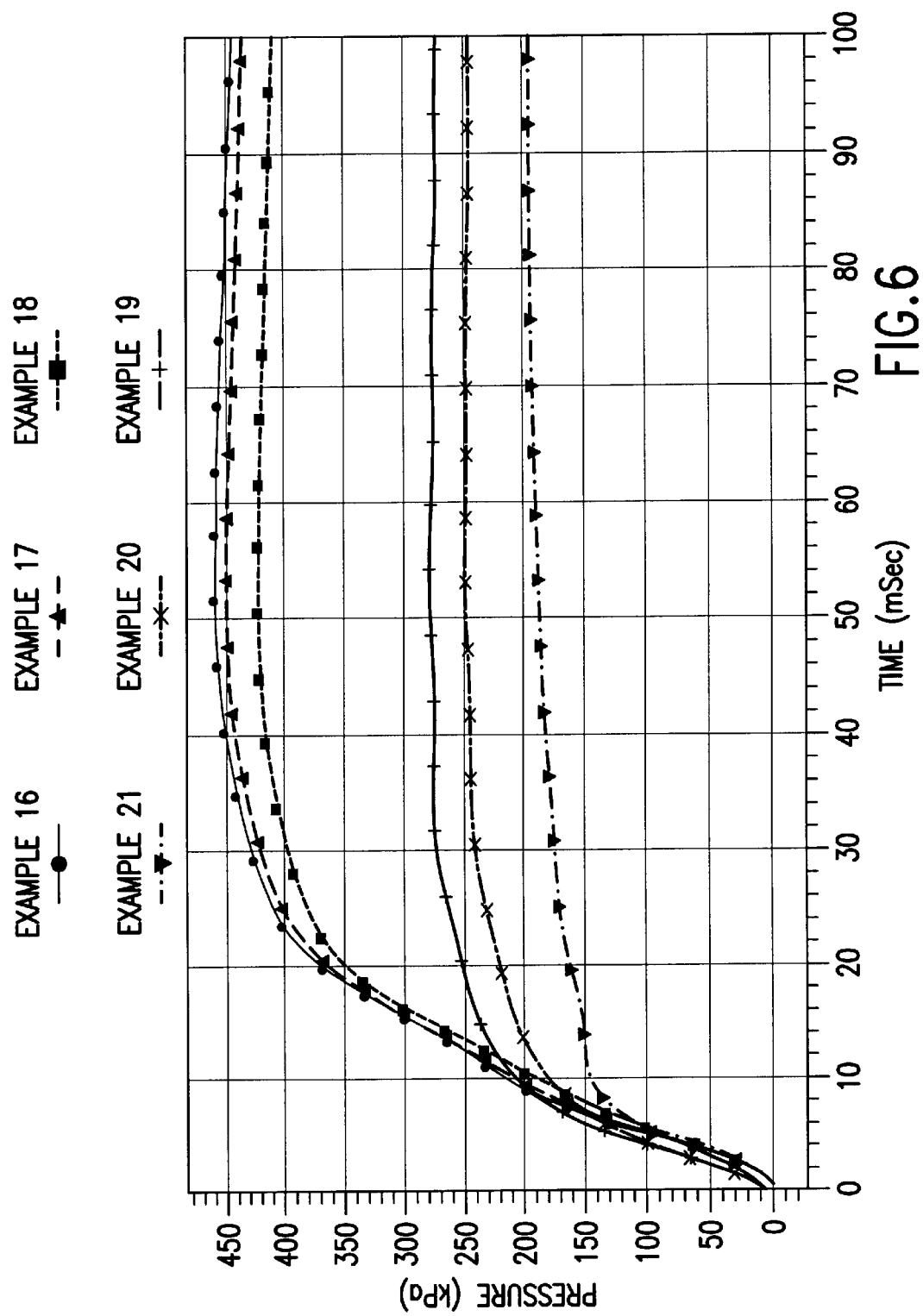
FIG. 6 is a graphical depiction of tank pressure as a function of time performance realized in Examples 16–21.

FIG. 6 is a graphical depiction of tank pressure as a function of time for each of the test inflators of Examples 16–21.
Discussion of Results As shown in FIG. 6, generally equivalent cushion inflation performance was realized with the inflator devices of Examples 19–21, as compared to the inflator devices of Examples 16–18 but with slightly more gas and significantly lower gas exit temperatures. Further, while both sets of inflators satisfied in-position deployment and the 80 kPa at 30 mSec requirements, the inflators of Examples 19–21 also satisfied desired stand-up criteria primarily due to the reduction in cushion damage versus that resulting from the relatively high peak pressures generated in Examples 16–18.

While the invention has been described above making specific reference to embodiments which include an initiator as a form of chamber opener and with the examples employing a squib-form of initiator, it is to be appreciated that the broader practice of the invention is not necessarily so limited and, if desired, other forms or types of chamber openers such as will be apparent to those skilled in the art and guided by the teachings herein provided can be used in the practice of the invention.

Thus, the invention provides an inflator apparatus or device wherein the molecular weight of the gas mixture therein contained is manipulated by varying the relative amounts of the various constituents thereof. As detailed above, through such manipulation and tight control of gas mixture molecular weight, the performance of the inflator can be properly tuned such as to desirably control or influence the speed of deployment of an associated airbag cushion and minimize or reduce damage to an associated airbag cushion caused by excessive deployment speeds, as well as satisfy the relatively onerous inflation demands required for proper or desired operation of various close proximity airbag cushions or inflatable restraint devices.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An apparatus for inflating an inflatable device, the apparatus comprising:
    a chamber containing a gas mixture under an elevated pressure, the gas mixture having an average molecular weight of at least 10 and no more than 15, the gas mixture effective to provide a gaseous inflation medium to inflate the inflatable device;
    a chamber opener actuatable to open the chamber; and
    a diffuser assembly including at least one exit port for directing gaseous inflation medium from the apparatus to the inflatable device.

2. The apparatus of claim 1 wherein the gas mixture includes at least two members of the group consisting of helium, argon, carbon dioxide, nitrous oxide, nitrogen and oxygen.

3. The apparatus of claim 1 wherein the gas mixture includes helium.

4. The apparatus of claim 3 wherein the gas mixture additionally includes carbon dioxide.

5. The apparatus of claim 3 wherein the gas mixture additionally includes nitrous oxide.

6. The apparatus of claim 5 wherein at least a portion of the gas mixture nitrous oxide dissociates to nitrogen and oxygen in the gaseous inflation medium directed to the inflatable device.

7. The apparatus of claim 3 wherein the gas mixture contains at least about 70 molar percent helium and no more than about 85 molar percent helium.

8. The apparatus of claim 7 wherein the gas mixture contains about 80 molar percent helium.

9. The apparatus of claim 1 wherein the gas mixture consists essentially of helium and at least one member selected from the group consisting of carbon dioxide and nitrous oxide.

10. The apparatus of claim 1 wherein the gas mixture consists essentially of helium and nitrous oxide.

11. The apparatus of claim 10 wherein the gas mixture contains about 80 molar percent helium.

12. An inflatable restraint system comprising:
    the apparatus of claim 1 and
    at least one close proximity inflatable restraint device in inflation medium transfer communication with the apparatus of claim 1 upon actuation thereof.

13. A method for inflating at least one close proximity inflatable restraint device, the method comprising:
    actuating the apparatus of claim 1 to effect direction of an inflation quantity of the gaseous inflation medium from the apparatus to the at least one close proximity inflatable restraint device.

14. An inflatable restraint system comprising:
    at least one close proximity inflatable restraint device and
    an inflator effective, upon actuation, to provide a gaseous inflation medium to the at least one close proximity inflatable restraint device, the inflator containing a gas mixture under an elevated pressure, the gas mixture having an average molecular weight of at least 10 and no more than 15 and consisting essentially of at least two members of the group consisting of helium, argon, carbon dioxide, nitrous oxide, nitrogen and oxygen.

15. The inflatable restraint system of claim 14 wherein the gas mixture includes helium.

16. The inflatable restraint system of claim 15 wherein the gas mixture additionally includes carbon dioxide.

17. The inflatable restraint system of claim 15 wherein the gas mixture additionally includes nitrous oxide.

18. The inflatable restraint system of claim 17 wherein at least a portion of the gas mixture nitrous oxide dissociates to nitrogen and oxygen in the gaseous inflation medium directed to the inflatable device.

19. The inflatable restraint system of claim 15 wherein the gas mixture contains at least about 70 molar percent helium and no more than about 85 molar percent helium.

20. The inflatable restraint system of claim 19 wherein the gas mixture contains about 80 molar percent helium.

21. The inflatable restraint system of claim 14 wherein the gas mixture consists essentially of helium and at least one member selected from the group consisting of carbon dioxide and nitrous oxide.

22. The inflatable restraint system of claim 14 wherein the gas mixture consists essentially of helium and nitrous oxide.

23. The inflatable restraint system of claim 22 wherein the gas mixture contains about 80 molar percent helium.

24. The inflatable restraint system of claim 14 wherein the at least one close proximity inflatable restraint device is a side impact airbag cushion.

25. The inflatable restraint system of claim 14 wherein the at least one close proximity inflatable restraint device is a curtain airbag cushion.

26. The inflatable restraint system of claim 14 wherein the at least one close proximity inflatable restraint device is a knee airbag cushion.

27. A method for inflating a close proximity inflatable airbag cushion, the method comprising:
    actuating an inflator device having a chamber containing a gas mixture under an elevated pressure, the gas mixture having an average molecular weight of at least 10 and no more than 15 and consisting essentially of at least two members of the group consisting of helium, argon, carbon dioxide, nitrous oxide, nitrogen and oxygen, the gas mixture effective to provide a gaseous inflation medium to inflate the close proximity inflatable airbag cushion.

28. The method of claim 27 wherein the gas mixture includes helium.

29. The method of claim 28 wherein the gas mixture additionally includes carbon dioxide.

30. The method of claim 28 wherein the gas mixture additionally includes nitrous oxide.

31. The method of claim 30 wherein at least a portion of the gas mixture nitrous oxide dissociates to nitrogen and oxygen in the gaseous inflation medium directed to the inflatable device.

32. The method of claim 28 wherein the gas mixture contains at least about 70 molar percent helium and no more than about 85 molar percent helium.

33. The method of claim 32 wherein the gas mixture contains about 80 molar percent helium.

34. The method of claim 27 wherein the gas mixture consists essentially of helium and at least one member selected from the group consisting of carbon dioxide and nitrous oxide.

35. The method of claim 27 wherein the gas mixture consists essentially of helium and nitrous oxide.

36. The method of claim 35 wherein the gas mixture contains about 80 molar percent helium.

37. The method of claim 27 wherein the close proximity inflatable airbag cushion being inflated is a side impact airbag cushion.

38. The method of claim 27 wherein the close proximity inflatable airbag cushion being inflated is a curtain airbag cushion.

39. The method of claim 27 wherein the close proximity inflatable airbag cushion being inflated is a knee airbag cushion.

* * * * *